Jan. 23, 1973  M. FRISTER  3,713,015
ALTERNATING CURRENT GENERATOR HAVING A TWIN PM ROTOR WHICH
IS ADJUSTABLE IN RESPONSE TO OUTPUT VOLTAGE
Filed Feb. 4, 1972  3 Sheets-Sheet 1

United States Patent Office 3,713,015
Patented Jan. 23, 1973

3,713,015
ALTERNATING CURRENT GENERATOR HAVING A TWIN PM ROTOR WHICH IS ADJUSTABLE IN RESPONSE TO OUTPUT VOLTAGE
Manfred Frister, Schwieberdingen, Germany, assignor to Robert Bosch GmbH, Stuttgart, Germany
Filed Feb. 4, 1972, Ser. No. 223,639
Claims priority, application Germany, Feb. 9, 1971, P 21 06 057.1
Int. Cl. H02p 9/40; H02k 21/16
U.S. Cl. 322—28                                    15 Claims

ABSTRACT OF THE DISCLOSURE

An alternating current generator has a stator having an output winding for producing an output voltage. A first permanent magnet rotor is mounted on the shaft of the generator for rotation therewith. A second permanent magnet rotor is mounted coaxially with the first permanent magnet rotor on the shaft, the second rotor being angularly adjustable with respect to the shaft about the common axis. Control means adjust the angular position of the second rotor, relative to the front rotor in response to changes of the output voltage.

BACKGROUND OF THE INVENTION

The present invention relates to alternating current generators, and in particular to such a generator which includes automatic voltage regulation means.

Alternating current generators are already known which have a stationary output winding in the stator and a permanent magnet rotor which provides the magnetic field. However, such generators present the problem that the magnetic field generated by the permanent magnet remains substantially constant regardless of the speed, which causes the output voltage induced in the output winding to vary as a function of the rotor speed. Thus, for example, if the speed of the rotor is increased, the voltage appearing at the output of the generator increases. Voltage or load regulation in such generators has already been attempted. In such known generators, the regulation has included the use of thyristors which have periodically short circuited the main winding or, alternately, have periodically opened the output circuit. In such a manner, the average output current has been regulated with some success.

However, with such known regulation apparatus, this has required complicated circuitry which has increased the cost of regulation, as well as increasing the likelihood of malfunction.

SUMMARY OF THE INVENTION

Accordingly, it is an object of the present invention to provide an alternating current generator which does not have the disadvantages known in the prior art.

It is another object of the present invention to provide an alternating current generator which is simple in construction and economical to manufacture and which can in a simple manner regulate the output voltage of the generator.

It is a further object of the present invention to provide an alternating current generator which uses permanent magnet rotors and which reliably regulate the output voltage of the generator in a simple manner and without the use of complicated electronic circuits.

According to the present invention, an alternating current generator comprises stator means having an output winding for producing an output voltage. Rotor means are provided within said stator means which comprise first and second rotor parts arranged adjacent to each other and angularly adjustable with respect to each other. Control means are also provided for cooperating with at least one of said rotor parts for adjusting the angular position thereof in response to changes in the output voltage.

According to a presently preferred embodiment, the rotor parts are permanent magnets and are aligned for rotation about a common axis, said control means adjusting said second rotor part about said common axis in relation to said first rotor part. Said second rotor part has an annular extension concentric with the common axis, the outer surface of the annular extension being provided with a helical gearing. A member which is slidable along the axis but which is mounted for rotation therewith includes corresponding helical gearing teeth which mesh with the teeth on the angular extension whereby relative axial movement between the annular extension and the slidable member causes angular rotation of the second rotor part in relation to the shaft. The position of the slidable member is controlled by a lever which is engaged with the member at one end thereof and at the other end said lever is connected to the armature of a solenoid which is energized by a voltage which is a function of the output voltage of the generator. Changes in the output voltage of the generator thus causes the armature to pivot said lever and thereby slide the member along the shaft. By thus changing the angular orientation of the two permanent magnet rotor parts relative one to the other, the effective magnetic field acting on the stator winding can thus be modified, with resulting output voltage regulation.

According to a modification of the above embodiment, the helical gearing teeth are replaced by a transverse slot on the surface of the angular extension which makes an angle with the axis and a driving bolt which is positioned inside the slot, said driving bolt moving axially along the shaft to effect the above relative rotation of the second rotor part to the first rotor part.

DESCRIPTION OF THE PREFERRED EMBODIMENTS

Figure 1:
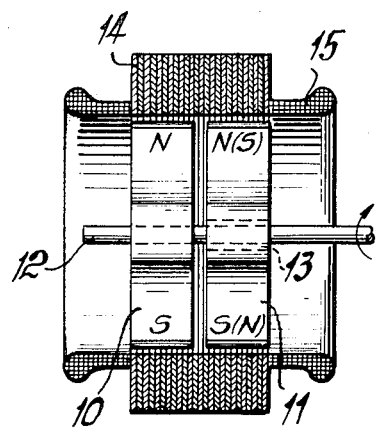
FIG. 1 is a schematic side view of a alternating current generator in accordance with the present invention.

FIG. 1 shows schematically an important principle of the present invention. Thus, a first rotor 10 and a second rotor 11 are mounted coaxially on a shaft 12. The rotor 10 is fixed to the shaft 12 for rotation therewith. On the other hand, the rotor 11 is mounted on a sleeve or bushing 13 which permits the angular displacement of the rotor 11 relative to the shaft 12 about their common axis. According to a presently preferred embodiment, the rotors 10 and 11 are constructed from permanent magnets. However, this is not a critical feature of the invention and armature windings which are connected to an energy source through suitable commutators can equally be utilized.

A laminated stator 14 is provided in a well-known manner and a stationary winding 15 is likewise provided in the stator. The permanent magnet rotors 10 and 11 are rotatable within the stator and generate a field which induces an output voltage in the winding 15 in accordance with well-known principles.

Thus, the rotor 10 is fixed to the shaft 12 and cannot move relative thereto; whereas the rotor 11 can be displaced in an angular direction about said shaft. The rotor 11 is adjustable so that in its normal position, its north (N) and south (S) poles are adjacent to the like poles of the rotor 10. However, the rotor 11 is displaceable, as to be more fully described, so that its poles are adjacent to the poles of the rotor 10 having the opposite polarities or any position between these extreme positions.

Figure 2:
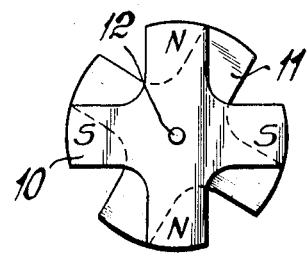
FIG. 2 is a schematic front view of the permanent magnet rotors utilized in the alternating current generator shown in FIG. 1.

If the rotors 10 and 11 are arranged so that both their north poles and south poles are adjacent to one another, then the effective magnetic field presented to the stator winding is a maximum and the output of the generator is correspondingly a maximum. As the rotor 11 is adjusted to change its angular orientation in relation to the rotor 10, as shown in FIG. 2, the effective magnetic field starts to decrease as a result of cancellation of the magnetic field of the two adjacent rotors. Finally, a position is reached where the north pole of the rotor 10 is adjacent to the south pole of the rotor 11 and the south pole of the rotor 10 is adjacent to the north pole of the rotor 11. In this condition, and assuming that the two permanent magnetic rotors have similar magnetic characteristics, the fields generated by the adjacent poles are effectively cancelled out in the stator winding so that a minimum field as well as output voltage is generated.

The amount of relative angular movement between the two rotors to change the output voltage from a maximum to a minimum will depend on the number of poles provided in the generator. Thus, the more poles which are provided, the less relative angular displacement between the rotors will be necessary to provide the requisite cancellation of fields. Particularly, the amount of relative angular rotation can be determined by the relationship $360°/n$, where $n$ is equal to the number of poles in the generator. For example, if two poles are provided, a total of 180° angular displacement will be necessary to change the output voltage from a maximum to a minimum. Similarly, for a four-pole generator, only 90° will be necessary.

Figure 3:
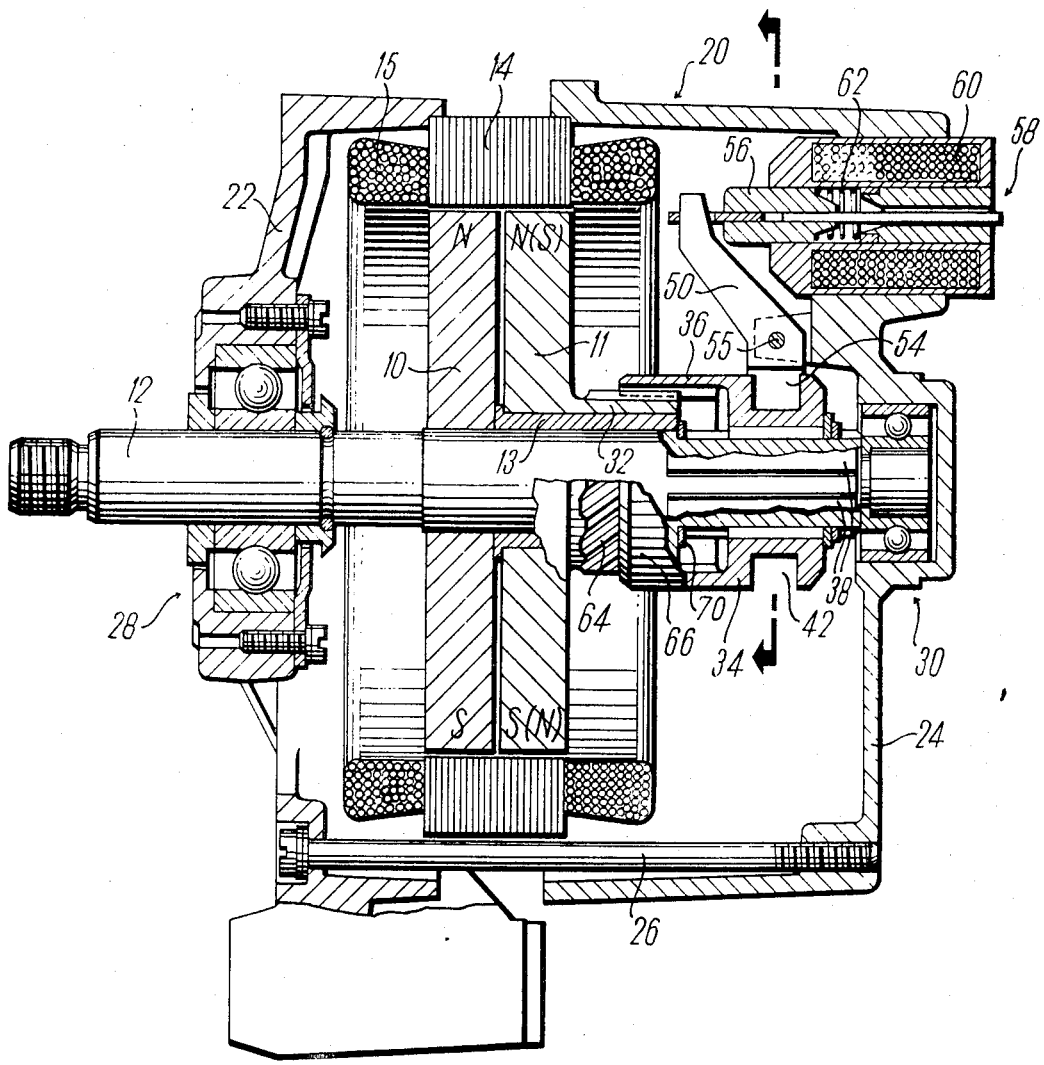
FIG. 3 is a side elevational view, partly in cross section, showing the details of the generator shown in FIG. 1.

Having examined the principle behind the operation of the present invention, FIG. 3 shows the details of a generator which utilized the above principle to automatically regulate the output voltage of a generator. Thus, the generator has a casing generally designated by the reference numeral 20, which consists of a front wall 22 and a rear wall 24. The front and rear walls are held together by a plurality of bolts 26 (only one of which is shown). A laminated stator part 14 is held by the front wall 22 and the rear wall 24 and is compressed by the tightening of the bolt 26.

The shaft 12 is shown to extend from the front wall 22 to the rear wall 24, said shaft being rotatably mounted in bearings 28 and 30 in said respective walls. Similar corresponding parts in FIGS. 1 and 3 have been designated by the same reference numerals.

Figure 4:
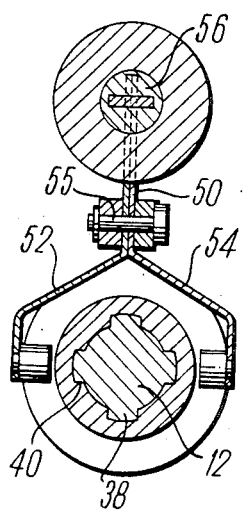
FIG. 4 is a fragmentary front elevational view, partly in cross section, of a part of the generator shown in FIG. 3, taken at line IV—IV.

In order to effect voltage regulation, it is necessary that the rotor 11 be angularly moved with respect to the shaft 12 for reasons above described. Thus, the rotor 11 is provided with an annular extension 32 which is concentric with the axis of the shaft 12. A member 34 is mounted on the shaft 12 for axial slidable movement thereon but which shares the movements of the shaft about the axis. The member 34 has a cup-shaped annular wall 36 whose inside dimensions are substantially equal to the out dimensions of the outer extension 32. Advantageously, the annular extension 32 and the annular wall 36 are so dimensioned so that the annular wall 36 may move axially along the shaft 12 in relation to the annular extension 32 to thereby fully cover or uncover the external surface of the latter. Referring to FIG. 4, the shaft 12 is shown to have axial projections 38 in the region between the annular extension 32 and the bearing 30. Corresponding axial slots 40 are provided in the member 34 which mate with the axial projections. From this, it is clear that the member 34 may slide axially on the shaft 12 but must rotate about the axis of the shaft together with the latter.

The member 34 is also provided with an annular slot 42. Referring to FIGS. 3 and 4, a lever 50, having a bifurcated end having prongs 52 and 54, is shown pivoted about a pivot 55. The pivot 55 is stationary with respect to the casing 20. Although the particular configuration of the lever 50 or its particular construction is not critical to the present invention, this lever is shown to be made up of two metal strips which are separated below the pivot point 56. Each of the prongs 52, 54 is directed to an opposite side of the member 34, the ends of the prongs 52 and 54 being placed within the annular slot 42 for bearing upon and for controlling the position of the member 34 as to be described.

The upper end of the lever 50 is connected to an armature 56 of an electromagnet 58, a solenoid in the present embodiment. The solenoid has a coil 60 and a spring 62.

In accordance with the presently preferred embodiment, the outer surface of the annular extension 32 as well as the inner surface of the annular wall 36 are each provided with helical gearing teeth 64 and 66 respectively, which have corresponding dimensions to thereby permit the meshing of said teeth. To prevent the axial movement of the rotor 11 and the bushing 13, a washer 70 is provided about the shaft 12.

As is commonly known, in such arrangements, when the shaft 12 is rotated, and therewith the rotors 11 and 12, an output voltage is induced in the output winding 15. Said output voltage is generally transmitted to a load. In accordance with the present invention, the output voltage is utilized for regulating said voltage. Thus, a voltage is applied to the solenoid 58 which is a function of the output voltage.

The output voltage could be transmitted directly to the solenoid 58 or the actual output voltage can be first compared with a desired reference voltage, and an error voltage being produced by this comparison then being transmitted to the solenoid 58. Comparison devices for comparing a desired voltage to the actual voltage are well known and do not form part of the present invention. Such comparison devices may either be of the electrical as well as mechanical type, both being equally suitable for use in connection with the present invention. For example, differential amplifiers are commonly used for such a purpose.

For the spring biasing arrangement for the solenoid 58 in the present example, the nature of the voltage applied to the solenoid 58 is of the error type wherein the actual output voltage has been compared with a desired reference value. Thus, it will be noted from FIG. 3, that when the solenoid 58 is deenergized, the helical spring 62 is so biased that it urges the armature 56 to move into its outermost left position as is shown. This in our example, would correspond to zero error voltage or the case where the actual output voltage is equal to the desired reference voltage. In this position of the armature 56, the lever 50 is in its uttermost counterclockwise position in response to pivoting about the pivot 55. Correspondingly, the prongs 52, 54, being engaged with the inner surfaces of the annular slot 42, urge the member 34 to move to its outermost right position, as shown. With the relative axial position of the annular extension 32 and the annular slot 36, as shown, the rotor 11 is positioned so that the like poles of the rotors 10 and 11 are positioned adjacent to one another to thereby reinforce the magnetic field applied to the output winding 15.

When an error signal appears at the solenoid 58, i.e. the actual output voltage and the desired output voltage are no longer equal, the coil 60 is energized, and the armature 56 is drawn towards the right against the compressive forces of the helical spring 62. As the armature 56 moves towards the right, it carries with it the upper end of the lever 50, thereby causing the latter to pivot about the pivot 36 in a clockwise direction. The clockwise movement of the prongs 52, 54 have the effect of urging the member 34, through one of the inner surfaces of the annular slot 42, to move in a leftward direction in relation to the shaft 12. However, since only the rotor 11 may change its angular position in relation to the shaft 12, when the member 34 moves in a leftward direction, the two helical gearing teeth 64, 66 being meshed, the rotor 11 is forced to change its relative angular position in relation to the rotor 10.

Now if the error voltage changes in the other direction, the solenoid 58 is provided with less energy, the helical spring 62 now being capable of moving the armature 56 to a more leftward position, the opposite relative angular orientation of the rotor 11 in relation to the shaft 12 takes place. The fixed axial position of the bushing 13 is assured by the washer 70 which prevents the rightward movement of the latter.

Thus, it is observed that in accordance with the present invention, changes in the output voltage from the generator are utilized to adjust the angular position of the two rotor parts with respect to each other and to thus regulate the output voltage. Although electromagnet means or a solenoid 58 has been illustrated for the purpose of actuating the member 34, and thereby the relative movement of rotor 11 in relation to the shaft 12, this use of an electromagnet or solenoid is not critical for the purpose of the present invention and any other actuating means may be utilized which will perform a similar function.

Figure 5:
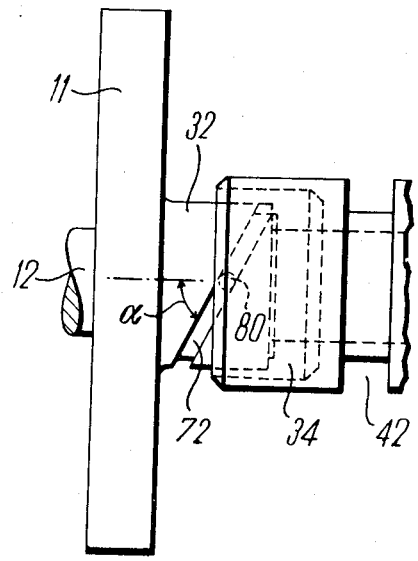
FIG. 5 is a fragmentary top plan view of part of a modified generator shown in FIG. 3.

Instead of utilizing helical gear teeth 64 and 66, a modification can be made, as shown in FIG. 5. Here, the helical gearing teeth 64 on the annular extension 32 have been replaced by a transverse slot 72 which is provided at an angle α in relation to the axis of the shaft 12. The helical gearing teeth 66 on the inner surface of the annular wall 36 have to be replaced by a driving bolt 80 which is positioned within the transverse slot 72 for riding therein. As with the prior embodiment, axial movement of the member 34 in relation to the annular extension 32 urges the rotor 11 to rotate angularly in relation to the shaft 12. In both cases, the pitch of the helical gearing teeth 64, 66 or the angle α are so selected that during movement of the member 34 over approximately the axial distance of the annular extension 32, a relative angular displacement of the rotors equivalent to 360°/n takes place. Thus, for example, as the armature 56 causes the member 34 to move from its position shown in FIG. 3 to a position where it has moved towards it outermost left position, the north and south pole positions of the rotor 11 must have reversed. The amount of angular rotation of the rotor 11 in order to effect complete cancellation of the magnetic field can be calculated by the relationship 360°/n., where n represents the number of poles in the generator. Thus, in the instance where only two poles are provided, the rotor 11 must be displaced a total of 180° to achieve the total cancellation of the magnetic field of the rotor 10 within the output winding 15. The more poles which are provided in the generator, the less total displacement is required before a total cancellation. Thus, where n is equal to 4, only relative rotation of 90° is required to change the output voltage from a maximum to a minimum, or vice versa.

It will be understood that each of the elements described above, or two or more together, may also find a useful application in other types of alternating current motors differing from the types described above.

While the invention has been illustrated and described as embodied in an alternating current generator having two angular displaceable rotors for regulating the output voltage, it is not intended to be limited to the details shown, since various modifications and structural changes may be made without departing in any way from the spirit of the present invention.

Without further analyses, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An alternating current generator comprising stator means having an output winding for producing an output voltage; rotor means within said stator means comprises first and second magnet rotor parts arranged adjacent to each other and angularly adjustable with respect to each other; and control means cooperating with at least one of said rotor parts for adjusting the angular position thereof in response to changes in the output voltage.

2. An alternating current generator as defined in claim 1, wherein said rotor parts are parmanent magnets.

3. An alternating current generator as defined in claim 2, wherein said two rotor parts are aligned for rotation about a common axis, said control means adjusting said second rotor part about said common axis in relation to said first rotor part.

4. An alternating current generator as defined in claim 3, wherein said first and second rotor parts are mounted on a common rotatable shaft, said first rotor part being connected to the latter to share the rotary movements thereof, and said second rotor part being rotatably mounted on said shaft to permit relative rotary movements of said second rotor part in relation to the latter.

5. An alternating current generator as defined in claim 2, wherein said second rotor part is provided with first engaging means; and wherein said control means comprises second engaging means only, said second engaging means being movable linearly along said common axis and causing angular movement of said first engaging means in relation to said common axis in response to relative axial movement of said two engaging means, and actuating means for producing such relative axial movements in response to changes in said output voltage.

6. An alternating current generator as defined in claim 5, wherein said first engaging means comprises an annular extension concentric with said common axis and connected to said second rotor part, the outer surface of said annular extension being provided with a transverse slot at an angle to said common axis; and wherein said second engaging means is a driving bolt connected to said actuating means and positioned within said transverse slot, whereby axial movements of said driving bolt causes said first engaging means to angularly rotate relative to said shaft.

7. An alternating current generator as defined in claim 6, wherein said angle of said annular slot to said common axis is selected to provide a predetermined relative angular rotation between said first and second rotor parts for a corresponding predetermined relative linear axial movement between said first and second engaging means.

8. An alternating current generator as defined in claim 5, wherein said first engaging means comprises an annular extension concentric with said common axis and connected to said second rotor part, the outer surface of said annular extension being provided with first helical gearing teeth along the direction of said common axis; and wherein said second engaging means is second helical gearing teeth along the direction of said common axis and having dimensions to correspond to those of said first helical gearing teeth to permit meshing therebetween; whereby axial movements of said second helical gearing teeth in an axial direction causes said first engaging means to angularly rotate relative to said shaft.

9. An alternating current generator as defined in claim 8, wherein said first and second helical gearing teeth have a pitch selected to provide a predetermined relative angular rotation between said first and second rotor parts for a corresponding predetermined relative linear axial movement between said first and second engaging means.

10. An alternating current arrangement as defined in claim 9, wherein said generator has $n$ poles and said predetermined angular rotation is equal to $360°/n$.

11. An alternating current arrangement as defined in claim 5, said first and second rotor parts are mounted on a common shaft and wherein said actuating means comprises a member mounted on said shaft for rotation therewith and for axial movement thereon, said member being connected to said second engaging means; lever means having two ends and being pivotally mounted therebetween, one end of said lever means controlling the axial position of said members; and electromagnetic means connected to the other end of said lever means, said electromagnetic means being actuatable by changes in said output voltage, whereby said lever means axially shifts said second engaging means as a function of said output voltage.

12. An alternating current arrangement as defined in claim 11, wherein said member has an annular slot concentric with said shaft, and wherein said one end of said lever means being bifurcated, the ends of the prongs of said lever means being respectively engaged with said concentric slot, whereby said member is rotatable about said shaft while its axial position is controlled by said one end of said lever means.

13. An alternating current arrangement as defined in claim 11, wherein said electromagnetic means comprises a solenoid having an armature whose position changes in response to changes in output voltage, the latter being connected to said other end of said lever means.

14. An alternating current arrangement as defined in claim 13, wherein said electromagnetic means includes a winding the energization of which causes said armature to move relative to an initial position, said winding being supplied an error voltage which is equal to the difference between a desired output voltage and the actual output voltage.

15. An alternating current arrangement as defined in claim 3, wherein said generator has two poles and said two rotor parts are angularly adjustable with respect to each other about 180° electrically.

References Cited

UNITED STATES PATENTS

| | | | |
|---|---|---|---|
| 3,483,410 | 12/1969 | Siegelman et al. | 310—114 |
| 3,525,005 | 8/1970 | Beyers | 322—51 X |
| 3,434,083 | 3/1969 | Lewis | 310—191 X |

J D MILLER, Primary Examiner

H. HUBERFELD, Assistant Examiner

U.S. Cl. X.R.

322—51; 310—114, 156, 191